July 10, 1956     E. KUPCHICK     2,753,681
BALANCED EXPANSIBLE LINKAGE WITH COVERED FRAME MEMBER
Filed June 23, 1953
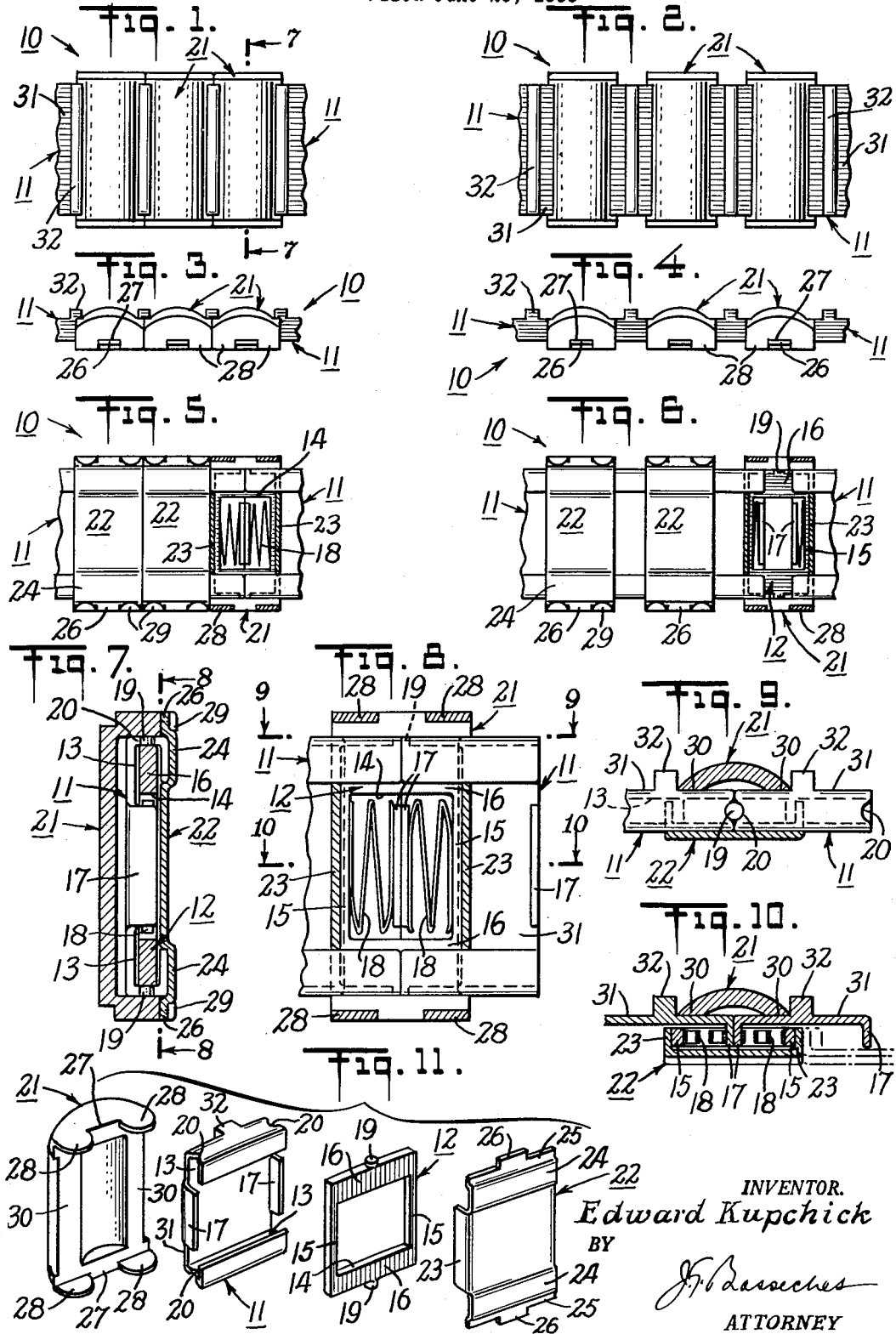
INVENTOR.
*Edward Kupchick*
BY
*J. F. Baroeches*
ATTORNEY 2,753,681

BALANCED EXPANSIBLE LINKAGE WITH COVERED FRAME MEMBER

Edward Kupchick, Brooklyn, N. Y.

Application June 23, 1953, Serial No. 363,438

4 Claims. (Cl. 59—79)

This invention relates to bracelets and more particularly to a spring contractile link bracelet.

It is an object of my invention to provide a bracelet construction in which a plurality of link elements are slidably joined to each other under the influence of spring elements. The object of my invention resides in the formation of the link elements to each other by the employment of slidable link elements which may be made from simple metal stampings and permit of assembly without the use of expensive jigs to hold the relatively slidable parts to each other whereby the desired flexibility is secured economically.

My invention particularly has for its object the provision of a bracelet made of relatively slidable link elements having the parts thereof biased toward each other under the influence of simple spring elements, such as W springs, and to provide an abutting relationship of the link elements whereby highly pleasing and ornamental effects are produced in the contractile position, while securing yieldability in the expanded position, which does not depreciate the ornamental relationship of the link elements.

To attain these objects and such further objects as may appear herein or be hereinafter pointed out, I make reference to the accompanying drawing, forming a part hereof, in which—

Figure 1 is a plan view showing a fragmentary portion of a bracelet in accordance with my invention;

Figure 2 is a corresponding view in the expanded position;

Figure 3 is an edge view of the link shown in Figure 1;

Figure 4 is an edge view of the bracelet shown in Figure 2;

Figure 5 is a plan view of the inside face of the braclet;

Figure 6 is a similar view to Figure 5 in the expanded position;

Figure 7 is a section taken on the line 7—7 of Figure 1;

Figure 8 is a section taken on the line 8—8 of Figure 7;

Figure 9 is a section taken on the line 9—9 of Figure 8;

Figure 10 is a section taken on the line 10—10 of Figure 8;

Figure 11 is an exploded perspective view of the bracelet parts.

Making reference to the drawing, the bracelet 10 is composed of a plurality of link elements 11 and 12, alternately spaced, which for convenience may be referred to as the edge channel link and the slide link, respectively.

The edge channel link 11 consists of a simple metal stamping having edge channels 13, 13, forming edge guides for the slide link 12. The slide link 12 is an open frame having a cutout 14, defined by side arms 15, 15 and edge branches 16, 16. The slide link is guided in the channels 13 of a contiguous edge channel link 11, there being provided side edge lugs 17, 17 to hold a pair of slide links locked in overlapping relation to each of the edge channel links.

Between one side lug 17 and a side arm 15 there is positioned an expansion spring 18 which, in the preferred form, is a W spring. Alternative W springs are inverted, as more clearly shown in Figure 8, the biasing action of these springs urging the channel links 11 toward each other, to bring contiguous lugs 17 in abutting position.

Each of the slide links 12 is medially provided on the edge branches 16 with upstanding stop lugs 19, thereby limiting the expansive force of the springs 18 to one half the width of the slide link by engagement of the lug seat 20 of the channel 13.

With the assembly thus provided, the gap between adjacent alternate channel links is overlapped by a cover assembly comprising a face cover segment 21 and a rear face segment 22.

The rear face segment 22 includes side lugs 23, 23, which project into the edge channel link 11 to engage the side arms 15, 15 of the slide link 12. The edges of the rear cover segment 22 are provided with offsets 24, 24 and lips 25, 25, each having a tongue 26 arranged to be seated in the bifurcations 27 of the face link 21. Tongues 28, 28 to each side of the bifurcations are arranged to span the tongues 26 to be locked in engaging position upon turning the tips 29 into engagement with the lips 25.

The side branches 30 are sufficiently extended with relation to each other to overlap the edge channel link 11 to the limit of sliding movement of the links 11 to each other, as shown in Figure 6.

To restrict the contractile action of the springs 18 and provide a desirable rectilinear or arcuate arrangement of the links thus joined, the link 11 on its face 31 is provided with a rib 32 whereby, under the contractile influence of the springs 18, the channel links are additionally abutted against the side arms 30 of the cover segment 21. Thus, a symmetrical arrangement of the link elements is preserved in the expansive movement of the link against the biasing influence of the springs and, conversely, under the contractile influence of the springs 18, symmetrical positioning of the link elements is maintained by the stop action of the stop lugs 19 and the ribs 32.

It will be understood that while I have shown and described link elements of the ornamental contour specifically illustrated, that the contours of the front segments 21 and ribs 32 may be variously modified and that I do not intend to be limited to the specific ornamental contour illustrated.

Having thus described my invention and illustrated its use, what I claim as new and desire to secure by Letters Patent is:

1. An expansible bracelet comprising a plurality of successively adjacent first links, a plurality of second links each having an opening therethrough to provide transverse sides, said second links interconnecting adjacent first links, the second links being slidably engaged with their respective first links, said first links being non-perforate and having depending transversely extending lugs entering the openings of said second links with said first links overlying adjacent transverse sides of successive second links, resilient means biased between first transverse sides of said openings of said second links and first of said lugs adjacent thereto, additional resilient means biased between second transverse sides of said second links and second of said lugs adjacent thereto, said two resilient means cooperating to urge said first links toward abutting position while permitting resilient expansion of the bracelet, successive gap cover means fitted over the said second links to span the areas between adjacent first links, and means for securing said cover means in position on said second links.

2. A bracelet as set forth in claim 1 wherein said means for securing said cover means is a second cover means carried by said second links.

3. A bracelet as set forth in claim 1 wherein said second links have edge lugs interposed between adjacent first links to center said second links with respect to respective adjacent first links.

4. A bracelet as set forth in claim 1 wherein said gap cover means are fitted over the first links, and said first links have face ribs thereon interposed between said gap cover means to center said gap cover means with respect to respective adjacent first links.

References Cited in the file of this patent

UNITED STATES PATENTS

| 1,461,203 | Bauer | July 10, 1923 |
| 1,517,104 | Chilson | Nov. 25, 1924 |

FOREIGN PATENTS

| 212,479 | Great Britain | Mar. 3, 1924 |
| 55,798 | Switzerland | May 10, 1911 |